W. P. HOOPES.
ELASTIC WHEEL FOR MOTOR VEHICLES.
APPLICATION FILED NOV. 23, 1910.
1,005,707.
Patented Oct. 10, 1911.
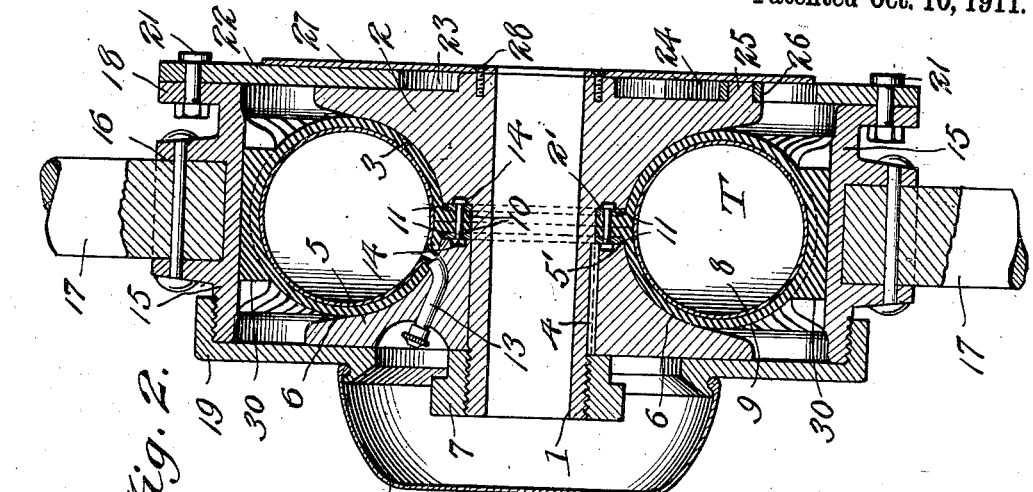
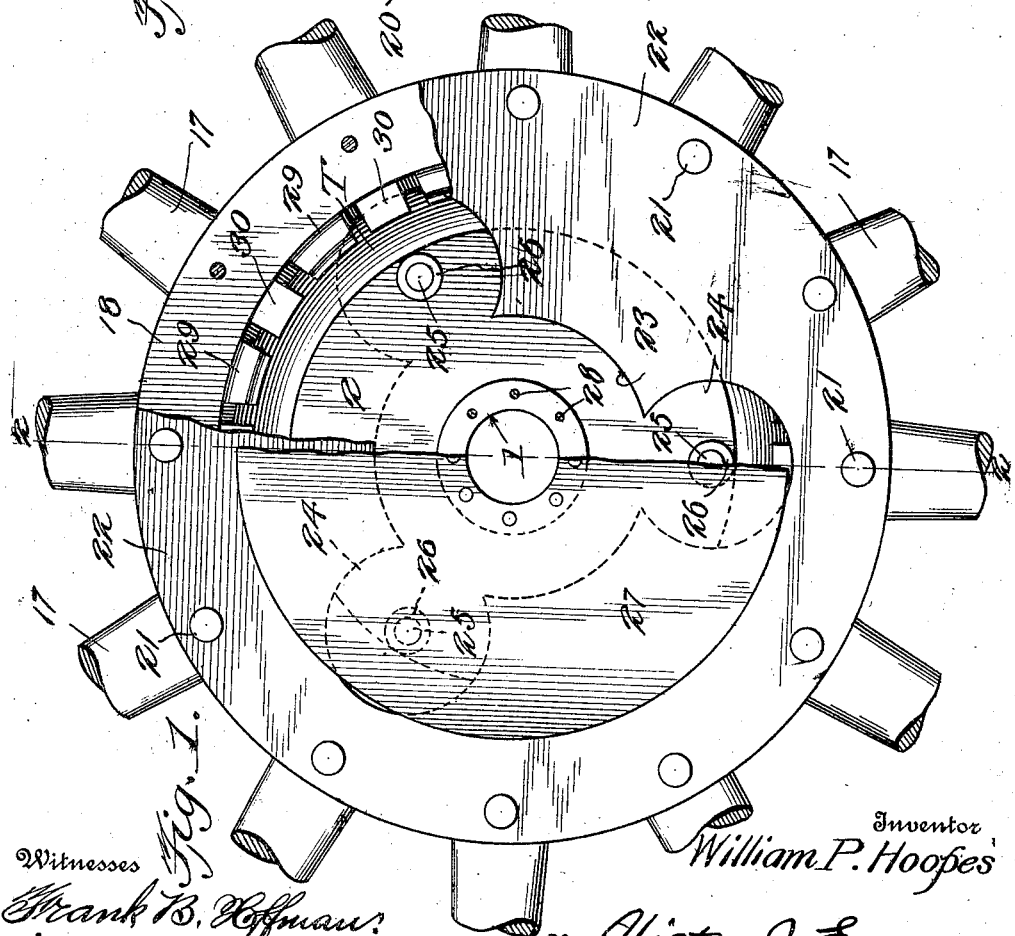
Witnesses
Frank B. Hoffman
Wm. Bagger
Inventor
William P. Hoopes
By Victor J. Evans
Attorney

UNITED STATES PATENT OFFICE.

WILLIAM P. HOOPES, OF MILTON, PENNSYLVANIA.

ELASTIC WHEEL FOR MOTOR-VEHICLES.

1,005,707.  Specification of Letters Patent.  Patented Oct. 10, 1911.

Application filed November 23, 1910. Serial No. 593,880.

*To all whom it may concern:*

Be it known that I, WILLIAM P. HOOPES, a citizen of the United States of America, residing at Milton, in the county of Northumberland and State of Pennsylvania, have invented new and useful Improvements in Elastic Wheels for Motor-Vehicles, of which the following is a specification.

This invention relates to elastic wheels for motor vehicles and the like, and it has particular reference to that class of wheels in which a pneumatic tire is placed or disposed within the hub in a position where, while it is protected from wear, it will impart the needed resiliency and elasticity to the wheel.

The present invention has for its object to simplify and improve the construction and operation of a wheel of the class referred to, and with these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side elevation showing the hub of the wheel embodying the invention, parts having been broken away in order to expose the underlying parts. Fig. 2 is a sectional view taken on the line 2—2 in Fig. 1.

Corresponding parts in both figures of the drawing are denoted by like characters of reference.

The improved wheel hub comprises a bearing sleeve 1 having at its inner end a flange 2 with an arcuate outer face 3. Fitted upon the sleeve 1 with which it may be connected by means of a key or spline 4 is a ring 5 having an arcuate inner face 6 which coöperates with the arcuate face 3 of the flange 2 to form a seat for the pneumatic tire T. The outer end of the sleeve 1 is threaded for the reception of a nut 7 by means of which the ring 5 may be forced in the direction of the flange 2.

The tire T comprises an inner tube 8 and an outer casing 9, which latter is provided at the edges thereof with inward extending flanges 10 which are confined between annular washer plates 11, the latter being connected by bolts 12 extending through the flanges 10. The inner tube is provided with a valved filling tube 13 extending through an aperture in the ring 5. The flange 2 and the ring 5 are provided with shoulders or offsets 2' and 5' having approximately parallel faces between which the flanges 10 and the washers 11 are confined, said faces being recessed, as shown at 14, for the reception of the heads and nuts of the connecting bolts 12.

A spoke ring 15 is provided, said ring being provided with sockets 16 for the reception of the inner ends of the spokes 17. The ring 15 has at its inner end a flange 18, and the outer end of said ring is threaded for the reception of an annular cap upon which a cover or closure 20 is detachably mounted to protect the wheel bearing from dirt and grit. Secured upon the flange 18 of the spoke ring by fastening members, such as bolts 21, is a plate 22. The plate 22 has a central aperture 23 for the passage of the inner extremity of the bearing sleeve 1. Said plate is also provided with a plurality of equidistant openings 24 for the passage of lugs or studs 25 extending from the flange 2 of the bearing sleeve and which, if desired, may be equipped with anti-friction rollers, as indicated at 26. A protecting plate 27 is mounted upon the inner end of the bearing sleeve 1 by means of fastenings, such as screws 28, said protecting plate being spaced from the flange 2 by the thickness of the plate 22. The spoke ring is provided upon its inner face with a plurality of equidistant inwardly extending lugs or transversely disposed flanges 29, and the casing or external covering 9 of the tire is provided at intervals with outwardly extending lugs 30 adapted to lie in the spaces intermediate the flanges 29 of the spoke ring, but not completely filling said spaces in order that ample room may be provided for relative movement of the parts. The lugs 30 may be molded or formed upon the casing 9 during the process of manufacturing the same, or they may be separately and subsequently applied thereto.

In the operation of this invention, the parts may be assembled by seating the tire upon the arcuate face 3 of the flange 2 and adjusting the lugs 30 of the tire casing between the flanges 29 of the spoke ring. The ring 5 is now placed in position to coöperate with the flange 2 to form a seat for the tire, said ring being held securely by means of the nut 7. The cap 19 is next threaded on to the spoke ring, it being observed that the tire seat comprising the flange 2 and the ring 5 will be slidably accommodated between the back plate 22 and the cap 19, both of which are connected with the spoke ring. The cover plate 27 and the closure 20 will serve to protect the device against the entrance of dirt and grit. Weight imposed upon the wheel will compress that portion of the tire which lies below the bearing sleeve, and when the wheel is advanced on the ground, the lugs 30, while free to move longitudinally between approximate flanges 29, will prevent displacement of the tire about the axis of the wheel.

The parts of the improved wheel are easily accessible for repairs and other purposes, and the general construction is simple, inexpensive and thoroughly efficient for the purposes for which it is provided.

Having thus described the invention, what is claimed as new is:—

In a pneumatic wheel of the character described, a bearing sleeve having an annular flange, a ring mounted slidably and non-rotatably upon the sleeve and coöperating with the flange to form a seat, said flange and ring having shouldered portions with faces disposed in parallel relation, a pneumatic tire occupying the seat and including a casing having flanges clamped between the opposed faces of the flange of the bearing sleeve and the ring slidable upon the latter, said tire being provided at intervals with outwardly extending lugs, a spoke ring supported upon the tire and provided at intervals with flanges between which the lugs of the tire are accommodated, a back plate, and a cap connected with the spoke ring and slidably engaging the seat flange and ring, and a cover plate secured upon the bearing sleeve and slidably engaging the back plate, substantially in the manner and for the purpose set forth.

In testimony whereof I affix my signature in presence of two witnesses.

WILLIAM P. HOOPES.

Witnesses:
G. M. APPLEBY,
J. W. APPLEBY.

Copies of this patent may be obtained for five cents each, by addressing the "Commissioner of Patents, Washington, D. C."